(12) United States Patent
Lim et al.

(10) Patent No.: US 8,054,844 B2
(45) Date of Patent: Nov. 8, 2011

(54) COMMUNICATION SYSTEM AND METHOD IN SHIP AREA NETWORK

(75) Inventors: Changgyu Lim, Daejeon (KR); Suyoung Bae, Daejeon (KR); Changsik Cho, Daejeon (KR); Dongsun Lim, Daejeon (KR); Hosang Ham, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 593 days.

(21) Appl. No.: 12/163,171

(22) Filed: Jun. 27, 2008

(65) Prior Publication Data

US 2009/0156159 A1 Jun. 18, 2009

(30) Foreign Application Priority Data

Dec. 13, 2007 (KR) .................. 10-2007-0130043

(51) Int. Cl.
*H04L 12/56* (2006.01)
(52) U.S. Cl. ......... 370/401; 370/326; 370/315; 370/335
(58) Field of Classification Search .................. 455/402, 455/403.1, 422.1, 427, 550.1, 575.9; 370/315, 370/335, 236; 340/12.32, 310.01
See application file for complete search history.

(56) References Cited

U.S. PATENT DOCUMENTS

| 6,584,080 B1* | 6/2003 | Ganz et al. .................... 370/315 |
| 7,080,127 B1* | 7/2006 | Hickman et al. .............. 709/208 |
| 7,598,844 B2* | 10/2009 | Corcoran et al. ........... 340/12.32 |
| 2004/0047313 A1* | 3/2004 | Rumpf et al. .................. 370/335 |
| 2004/0110483 A1* | 6/2004 | Mollenkopf .................... 455/402 |
| 2005/0168326 A1* | 8/2005 | White et al. ............. 340/310.01 |
| 2005/0251402 A1* | 11/2005 | Olsen et al. ........................ 705/1 |
| 2006/0170285 A1* | 8/2006 | Morimitsu et al. ................ 307/3 |
| 2007/0201540 A1* | 8/2007 | Berkman ....................... 375/219 |
| 2007/0286079 A1* | 12/2007 | Mollenkopf et al. .......... 370/236 |
| 2009/0187285 A1* | 7/2009 | Yaney et al. ................... 700/292 |
| 2009/0269062 A1* | 10/2009 | Jestel et al. ..................... 398/59 |

FOREIGN PATENT DOCUMENTS

| KR | 1020040029701 A | 4/2004 |
| KR | 1020060013292 A | 2/2006 |
| KR | 10-0651737 B1 | 11/2006 |

* cited by examiner

*Primary Examiner* — David Q Nguyen

(57) ABSTRACT

The present invention relates to a communication system and method in a ship area network. In a network of a structure including a plurality of shielded regions, communication is performed between terminals provided in the shielded region by using wireless communication, and communication is performed between terminals provided in different shielded regions by further using power line communication, optical communication, or the power line communication and the optical communication in addition to the wireless communication. Therefore, it is possible to obtain advantages of minimizing inconvenience, which is caused by using only wire communication in the related art, and enlarging a working area.

7 Claims, 3 Drawing Sheets

COMMUNICATION SYSTEM AND METHOD IN SHIP AREA NETWORK

BACKGROUND OF THE INVENTION

1. Field of the Invention

The present invention relates to a communication system and method in a ship area network, and more particularly, to a communication system and method between mobile terminals in a ship area network where electric waves are shielded.

This work was supported by the IT R&D program of MIC/IITA [2005-S-022-03, Embedded Software-based SmarTown Solution].

2. Description of the Related Art

The demand for a mobile communication terminal as personal portable communication means has increased in recent years, such that the mobile communication terminal becomes a necessity of life. Since it is not possible to satisfy the consumer's desire with a function of communication means for the transmission/reception of only voice, there has been released a mobile communication terminal having various and new functions and additional services.

However, wireless communication can not be performed between communication terminals by using a communication system in the related art in an environment such as a network in a ship area, which is generally surrounded by steel so that electric waves are shielded. Due to the above reason, only wire communication has been used. Therefore, there is a limitation on a working area where working is freely performed.

SUMMARY OF THE INVENTION

The present invention has been made to solve the above-mentioned problem, and it is an object of the present invention to provide a communication system and method in a ship area network that performs communication between terminals in a region shielded by steel by using wireless communication, and performs communication between terminals in different shielded regions, which are shielded so that electric waves do not pass through the regions, by using power line communication and optical communication.

According to an aspect of the present invention, there is provided a communication system in a network of a structure including a plurality of shielded regions. The communication system includes a wireless communication device that is used to perform communication between terminals located in the shielded regions, and a power line communication device that is connected to the wireless communication device and provides power line communication. Communication is provided between terminals located in the same shielded region by using the wireless communication device, and communication is provided between terminals located in different shielded regions by using the wireless communication device and the power line communication device.

The communication system may further include an optical network device that is connected to the power line communication device and provides optical communication. Communication may be provided between the terminals located in the different shielded regions by further using the optical network device as well as the wireless communication device and the power line communication device, in consideration of a distance between the terminals and the region to which the terminal belongs.

The wireless communication device may include at least one wireless communication repeater. The wireless communication repeater directly routes and transmits a signal from a first terminal to a second terminal in consideration of the location of the second terminal, or converts the signal into an upstream signal and transmits the upstream signal to the power line communication device.

The power line communication device may include at least one power line communication repeater. The power line communication repeater receives a signal supplied from the wireless communication device and then transmits the signal to another power line communication repeater in consideration of the position of a second terminal, or converts the received signal into an upstream signal and transmits the upstream signal to the optical network device.

One power line communication repeater may be in charge of one shielded region.

The optical network device may include at least one optical communication repeater. The optical communication repeater receives a signal supplied from the power line communication repeater, and transmits the signal to another optical communication repeater that is in charge of a region to which the second terminal belongs.

When receiving a signal from the optical network device, the power line communication repeater may convert the received signal into a downstream signal and transmit the downstream signal to the wireless communication device. Further, when receiving a downstream signal from the power line communication device, the wireless communication repeater may transmit the received signal to the second terminal.

According to another aspect of the present invention, there is provided a communication system in a network of a structure including a plurality of shielded regions. The communication system performs communication between terminals provided in the shielded region by using wireless communication; and performs communication between terminals provided in different shielded regions by further using power line communication, optical communication, or the power line communication and the optical communication in addition to the wireless communication.

According to another aspect of the present invention, there is provided a communication method in a network of a structure including a plurality of shielded regions. The communication method includes performing communication between terminals located in the shielded region by using wireless communication; and performing communication between terminals located in different shielded regions by further using power line communication, or optical communication, or the power line communication and the optical communication in addition to the wireless communication.

According to the present invention, communication is performed between terminals in a region shielded by steel by using wireless communication, and communication is performed between terminals in different shielded regions, which are shielded so that electric waves do not pass through the regions, by using power line communication. Therefore, it is possible to obtain advantages of minimizing inconvenience, which is caused by using only wire communication in the related art, and enlarging a working area.

DESCRIPTION OF THE PREFERRED EMBODIMENTS

A preferred embodiment of the present invention will be described below with reference to accompanying drawings.

Figure 1:
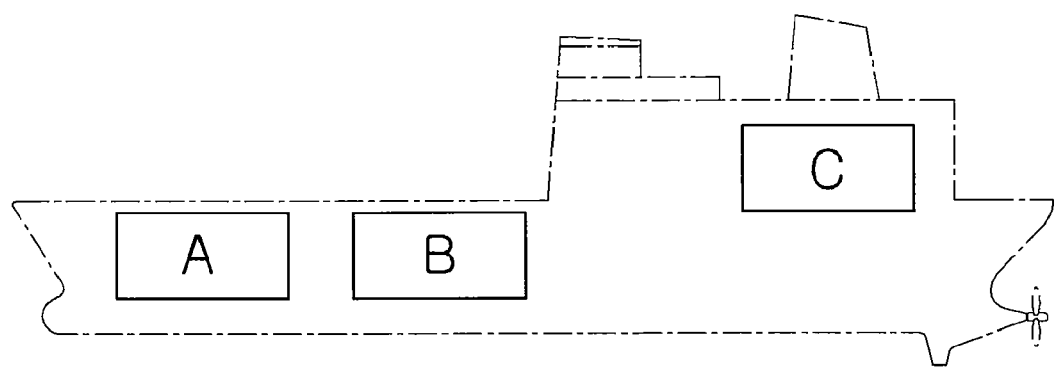
FIG. 1 is a view showing an embodiment of the internal structure of a ship to which the present invention is applied.

FIG. 1 is a view showing an embodiment of the internal structure of a ship to which the present invention is applied.

Each of region A, region B, and region C shown in FIG. 1 is surrounded by steel so that electric waves are shielded. Accordingly, wireless signals can be freely transmitted only within each region.

In a communication system according to the present invention, a wireless communication method is used between two terminals provided in region A, and a power line communication method as well as a wireless communication method is used between a terminal provided in region A and a terminal provided in region B. Further, an optical communication method is further used between a terminal provided in region A and a terminal provided in region C, so that intercommunication is performed between the terminals.

Figure 2:
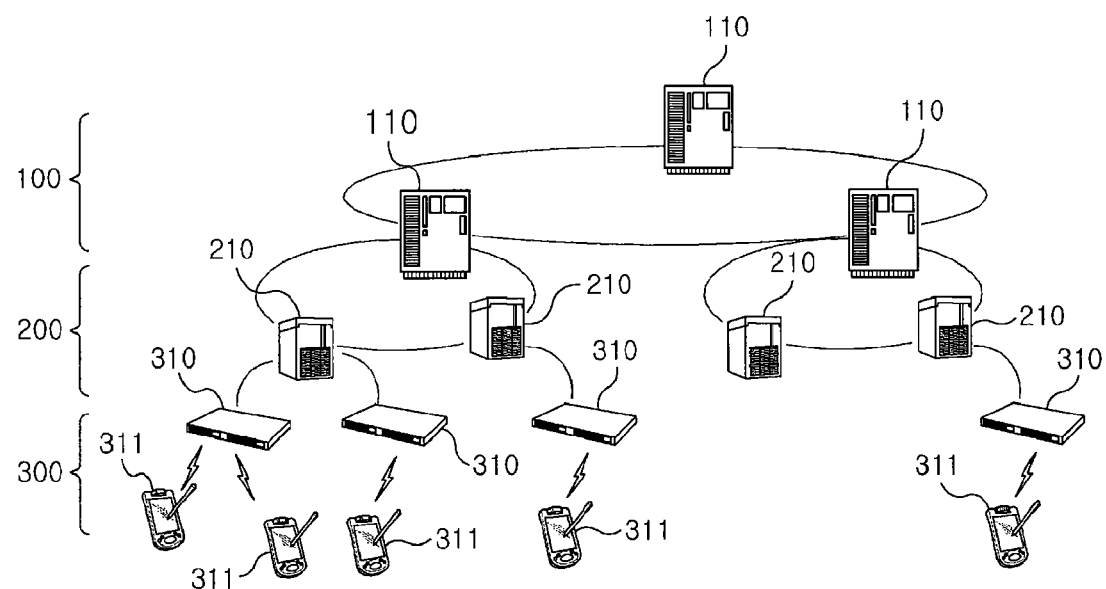
FIG. 2 is a block diagram of a communication system in a ship area network according to an embodiment of the present invention.

FIG. 2 is a block diagram of a communication system in a ship area network according to an embodiment of the present invention.

As shown in FIG. 2, the communication system according to the present invention generally includes an optical network device 100, a power line communication device 200, and a wireless communication device 300.

The optical network device 100 includes at least one optical communication repeater 110. Although not shown, an optical communication controller, an optical communication transceiver, and a power line communication transceiver are included in the optical communication repeater 110. The optical communication transceiver performs transmission and reception for the communication with other optical communication repeaters of the optical network device 100, and the power line communication transceiver performs transmission and reception for the communication with at least one power line communication repeater 210 connected to the optical communication repeater 110. Further, the optical communication controller controls the flow of communication data transmitted to other optical communication repeaters through the optical communication repeater 110, or the flow of the communication data transmitted to the power line communication repeater 210 through the optical communication repeater 110.

The power line communication device 200 includes at least one power line communication repeater 210. Although not shown, a power line communication controller, a power line communication transceiver, an optical communication transceiver, and a wireless communication transceiver are included in the power line communication repeater 210. The power line communication transceiver transmits and receives communication data to/from other power line communication repeaters connected to the power line communication repeater, and the optical communication transceiver performs transmission and reception of data with the power line communication repeaters 210. The wireless communication transceiver performs transmission and reception of data with wireless communication repeaters 310 of the wireless communication device 300 that is a subordinate device of the power line communication device 200. Further, the power line communication controller is connected to the power line communication transceiver, the optical communication transceiver, and the wireless communication transceiver, and controls the data flow of a downstream signal or an upstream signal.

Furthermore, the wireless communication device 300 includes at least one wireless communication repeater 310 and at least one mobile terminal 311. The wireless communication repeater 310 includes a wireless communication controller, a wireless communication transceiver, and a power line communication transceiver. The wireless communication transceiver performs transmission and reception of communication data with other wireless communication repeaters, and the power line communication transceiver performs transmission and reception of communication data with the power line communication repeaters 210 of the power line communication device 200 that is a superordinate device. Further, the wireless communication controller is connected to the wireless communication transceiver and the power line communication transceiver, and controls the flow of a downstream signal transmitted to the mobile terminal 311 or an upstream signal transmitted from the mobile terminal 311 to the superordinate device.

In the embodiment shown in FIG. 2, the power line communication repeaters 210 have been connected to other power line communication repeaters, which belong to regions assigned to the optical communication repeaters 110 of the superordinate device, in the form of a token ring. However, the embodiment of the present invention is not limited thereto, and the power line communication repeaters may have a mesh structure in which all of the power line communication repeaters, which are provided around one optical communication repeater 110 in a region assigned to the optical communication repeater, are connected to the optical communication repeater in the form of one-to-one connection. In this case, since the power line communication repeater 210 does not need to communicate with other power line communication repeaters, the power line communication transceiver is not needed.

Figure 3:
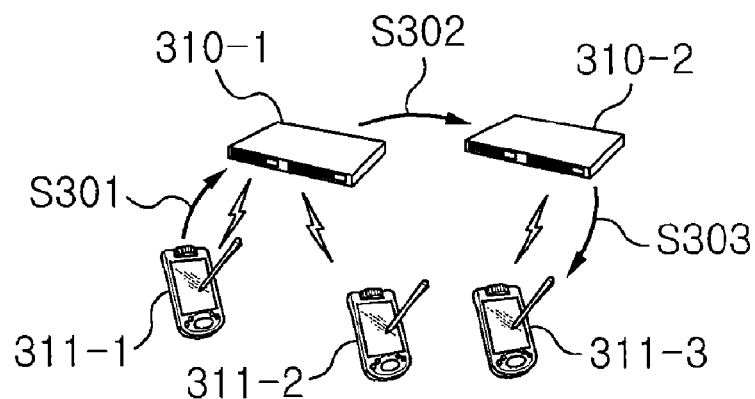
FIG. 3 is a view showing communication flow between two mobile terminals provided in a region, which is shielded by steel, of a ship area in accordance with an embodiment of the present invention.
Figure 4:
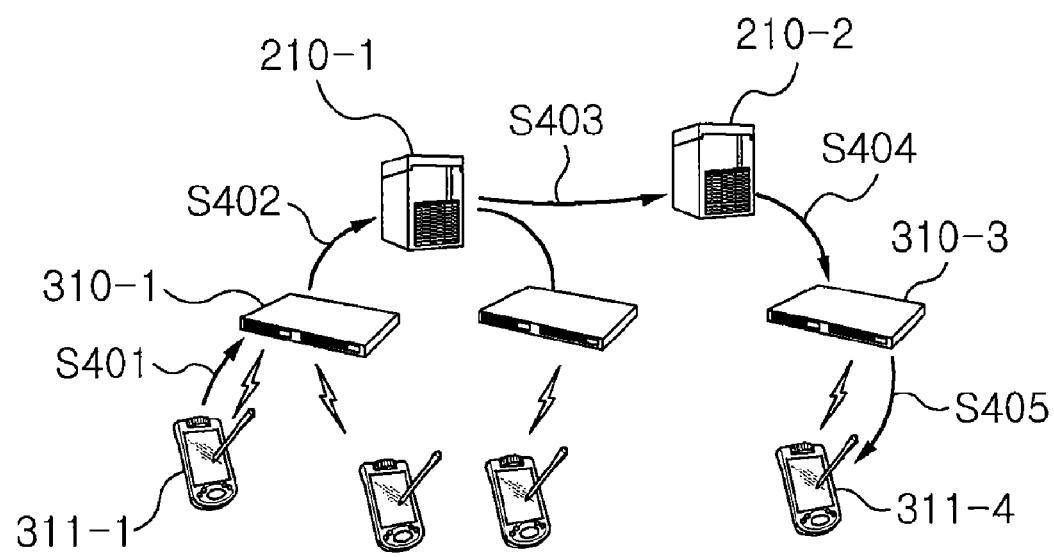
FIG. 4 is a view showing communication flow between two mobile terminals provided in different shielded regions, which are adjacent to each other, of a ship area in accordance with an embodiment of the present invention.
Figure 5:
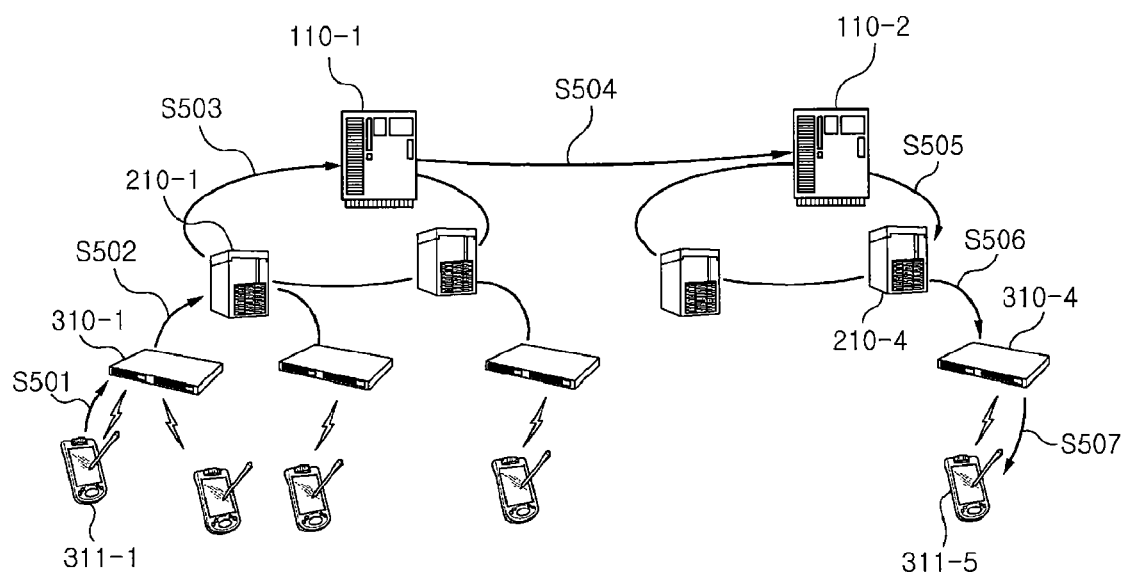
FIG. 5 is a view showing communication flow between two mobile terminals provided in different shielded regions, which are far from each other, of a ship area in accordance with an embodiment of the present invention.

When communicating with one another using the communication system in the ship area shown in FIG. 2, the mobile terminals may communicate with one another by methods shown in FIGS. 3 to 5 according to conditions. The methods will be sequentially described below.

FIG. 3 is a view showing communication flow between two mobile terminals provided in a region, which is shielded by steel, of a ship area in accordance with an embodiment of the present invention.

FIG. 3 shows the flow of a signal that is transmitted from a first mobile terminal 311-1 to a third mobile terminal 311-3. The signal sent from the first mobile terminal 311-1 is transmitted to a first wireless communication repeater 310-1 that is in charge of the first mobile terminal 311-1 (S301). The first wireless communication repeater 310-1 recognizes that the third mobile terminal 311-3 serving as the destination is not a mobile terminal assigned to its own but a mobile terminal assigned to a second wireless communication repeater 310-2. Then, the first wireless communication repeater transmits a signal to the second wireless communication repeater 310-2 (S302). The second wireless communication repeater 310-2, which receives the signal, transmits a signal to the third mobile terminal 311-3 assigned to its own. The transmission of a signal from the third mobile terminal 311-3 to the first mobile terminal is performed in reverse order of the above process.

In the embodiment of FIG. 3, mobile terminals controlled by different wireless communication repeaters communicate with each other. However, the first and second mobile terminals 311-1 and 311-2 controlled by the same wireless communication repeater can communicate with each other through the only first wireless communication repeater 310-1. This is applied to the communication between two mobile terminals that are close to each other, as shown in FIG. 3.

FIG. 4 is a view showing communication flow between two mobile terminals provided in different shielded regions, which are adjacent to each other, of a ship area in accordance with an embodiment of the present invention.

FIG. 4 shows the flow of a signal that is transmitted from a first mobile terminal 311-1 to a fourth mobile terminal 311-4. The first and fourth mobile terminals (for example, the terminal provided in region A of FIG. 1 and the terminal provided in region B) are provided in different regions. The regions are shielded so that electric waves do not pass through the regions.

The signal sent from the first mobile terminal 311-1 is transmitted to a first wireless communication repeater 310-1 that is in charge of the first mobile terminal 311-1 (S401). The first wireless communication repeater 310-1, which receives the signal, coverts the received signal into an upstream signal, and transmits the upstream signal to a first power line communication repeater 210-1 that is a superordinate device (S402). The first power line communication repeater 210-1, which receives the signal, transmits the signal to a second power line communication repeater 210-2 that is in charge of the fourth mobile terminal 311-4 (S403). The second power line communication repeater 210-2 converts the received signal into a downstream signal, and transmits the downstream signal to a third wireless repeater 310-3 connected to the fourth mobile terminal 311-4 (S404). Finally, the third wireless repeater 310-3, which receives the signal, converts the signal into a wireless signal, and transmits the wireless signal to the fourth mobile terminal 311-4 (S405). As a result, the signal is transmitted to the fourth mobile terminal that is the destination.

The transmission of a signal from the fourth mobile terminal 311-4 to the first mobile terminal 311-1 is performed in reverse order of the above process.

FIG. 5 is a view showing communication flow between two mobile terminals provided in different shielded regions, which are far from each other, of a ship area in accordance with an embodiment of the present invention.

A distance between two mobile terminals 311-1 and 311-5 (for example, the terminal provided in region A of FIG. 1 and the terminal provided in region C) is larger in the embodiment of FIG. 5 as compared to the embodiment of FIG. 4.

The signal sent from the first mobile terminal 311-1 is transmitted to the first wireless communication repeater 310-1 that is in charge of the first mobile terminal 311-1 (S501). The first wireless communication repeater 310-1, which receives the signal, coverts the received signal into an upstream signal, and transmits the upstream signal to the first power line communication repeater 210-1 that is a superordinate device (S502). The first power line communication repeater 210-1, which receives the signal, again converts the received signal into an upstream signal, and transmits the upstream signal to a first optical communication repeater 110 (503). The first optical communication repeater 110, which receives the signal, recognizes that a second optical communication repeater 110-2 is in charge of a fifth mobile terminal 311-5 serving as the destination, and transmits the signal to the second optical communication repeater 110-2 (S504). The second optical communication repeater 110-2 converts the received signal into a downstream signal, and transmits the downstream signal to the fourth power line communication repeater 210-4 (S505). The fourth power line communication repeater 210-4 again converts the received signal into a downstream signal, and transmits the downstream signal to a fourth wireless communication repeater 310-4 (S506). Finally, the fourth wireless communication repeater 310-4 converts the received signal into a wireless signal, and transmits the wireless signal to the fifth mobile terminal 311-5 that is the destination (S507).

The transmission of a signal from the fifth mobile terminal 311-5 to the first mobile terminal 311-1 is performed in reverse order of the above process.

Although the preferred embodiments of the present invention have been disclosed, those skilled in the art will appreciate that various modifications and changes without departing from the scope and spirit of the invention. For example, as for all of the embodiments, a ship has been described as an example of a place that includes shielded inner spaces. However, the present invention is not limited to the communication in the ship, and may be applied to a factory where various shielded spaces are provided. Therefore, as long as a plurality of spaces is provided, the present invention may be any place.

What is claimed is:

1. A communication system in a network of a structure including a plurality of shielded regions where electric waves are shielded, the communication system comprising:
    a wireless communication device configured to perform communication between terminals located in the same shielded region;
    a power line communication device connected to the wireless communication device and configured to provide power line communication to perform communication between terminals located in different shielded regions; and
    an optical network device connected to the power line communication device and configured to provide optical communication,
    wherein the wireless communication device comprises:
        at least one wireless communication repeater configured to directly route and to transmit a signal from a first terminal to a second terminal if the first and second terminals are located in the same shielded region, or to convert the signal from the first terminal into a first upstream signal and to transmit the first upstream signal to the power line communication device if the first and second terminals are located in the different shielded regions, respectively, and
    wherein the power line communication device comprises:
        at least one power line communication repeater configured to receive the first upstream signal to transmit the first upstream signal to another power line communication repeater in which the second terminal is located, or to convert the first upstream signal into a second upstream signal and to transmit the second upstream signal to the optical network device, according to a distance between the first terminal and the second terminal.

2. The communication system according to claim 1, wherein one power line communication repeater is in charge of one shielded region.

3. The communication system according to claim 1, wherein the optical network device includes:
at least one optical communication repeater configured to receives the second upstream signal and to transmit the second upstream signal to another optical communication repeater that is in charge of a region to which a receiving terminal belongs.

4. The communication system according to claim 1, wherein when receiving a signal from the optical network device, the power line communication repeater converts the received signal into a downstream signal and transmits the downstream signal to the wireless communication device.

5. The communication system according to claim 1, wherein when receiving a downstream signal from the power line communication device, the wireless communication repeater transmits the received signal to a receiving terminal.

6. A communication method in a network of a structure including a plurality of shielded regions where electric waves are shielded, the communication method comprising:
performing communication between terminals located in a shielded region by using wireless communication; and
performing communication between terminals located in different shielded regions by further using power line communication, or the power line communication and optical communication, in addition to the wireless communication, according to a distance between the terminals located in the different shielded regions,
wherein the performing of the communication between the terminals located in the different shielded regions comprises:
converting a signal transmitted from a first terminal into a first upstream signal;
transmitting the first upstream signal to a power line communication repeater; and
transmitting the first upstream signal from the power line communication repeater to another power line communication repeater, or converting the first upstream signal into a second upstream signal and transmitting the second upstream signal to an optical communication repeater, according to a distance between the first terminal and a second terminal.

7. The communication method according to claim 6, wherein the converting of the first upstream signal further comprises:
transmitting the second upstream signal to another optical communication repeater being in charge of a region to which the second terminal belongs.

* * * * *